(12) United States Patent
Rogers et al.

(10) Patent No.: US 6,383,242 B1
(45) Date of Patent: May 7, 2002

(54) MOBILE ENCLOSURE UNIT

(75) Inventors: Gregory Allan Rogers, Olivenhain; Jeff Robert Blair, San Diego, both of CA (US)

(73) Assignee: Pacific Environmental Systems, San Diego, CA (US)

( * ) Notice: Subject to any disclaimer, the term of this patent is extended or adjusted under 35 U.S.C. 154(b) by 0 days.

(21) Appl. No.: 09/519,934

(22) Filed: Mar. 7, 2000

(51) Int. Cl.[7] .............................................. B01D 50/00
(52) U.S. Cl. .......................... 55/385.2; 55/356; 454/63; 52/63; 52/DIG. 12
(58) Field of Search .......................... 52/63, 79.1, 79.5, 52/DIG. 12, 79.9, 79.12, 143; 135/93, 94; 454/63; 55/356, 385.1, 385.2, 385.4, 385.7

(56) References Cited

U.S. PATENT DOCUMENTS

| | | |
|---|---|---|
| 3,265,059 A | 8/1966 | Matthews |
| 3,352,313 A | 11/1967 | Kroenig |
| 3,896,831 A | 7/1975 | Feldman et al. |
| 4,000,749 A | 1/1977 | Busco |
| 4,067,346 A | 1/1978 | Husted |
| 4,682,448 A | 7/1987 | Healey |
| 4,765,352 A | * 8/1988 | Strieter ........................ 454/63 |
| 5,062,871 A | * 11/1991 | Lemon, III ................ 55/385.2 |
| 5,080,701 A | * 1/1992 | Howard et al. ............... 55/356 |
| 5,558,112 A | * 9/1996 | Strieter ...................... 55/385.2 |

OTHER PUBLICATIONS

FIBERLOCK, Kontrol Kube® Kontrol Kube Jr., brochure, Dec. 13, 1999, website address www.fiberlock.com.

* cited by examiner

*Primary Examiner*—Michael Safavi
(74) *Attorney, Agent, or Firm*—Brown, Martin, Haller & McClain, LLP

(57) ABSTRACT

A mobile enclosure unit for containment of contaminants has a vertical, wheeled frame assembly having an open upper end and a lower wall. The frame assembly is adjustable in height so that the open upper end can be positioned in contact with a ceiling, allowing access for workers to work on or in the ceiling. A pliable cover sleeve surrounds the frame assembly from the upper end to the lower wall to form a chamber within the frame assembly having an open upper end to allow a worker in the chamber to access the ceiling area above the open end of the unit. An exhaust system is mounted in the frame inside the sleeve for drawing in air from the chamber, filtering debris from the air, and exhausting filtered air from the chamber.

19 Claims, 4 Drawing Sheets

MOBILE ENCLOSURE UNIT

BACKGROUND OF THE INVENTION

The present invention relates to a mobile enclosure unit for use in collecting airborne debris and contaminants inside a building while carrying out construction or repair work on or within a ceiling.

When conducting necessary construction and repair work inside a building, it is often necessary to restrict debris and airborne contaminants from falling onto the ground or entering the air in the surrounding space. This is particularly true when such work is carried out in a hospital, clinic, laboratory, or other sensitive or critical area, and when the work will create potentially hazardous dust or debris, such as asbestos dust.

U.S. Pat. No. 4,682,448 of Healey describes a shelter which defines an enclosure of rectangular cross-section extending from the floor to the ceiling, and having a top opening for access to a ceiling so that a worker in the shelter can carry out work on the ceiling without releasing contaminants into the area surrounding the shelter. The worker places a stepladder within the enclosure for access to the ceiling. An external vacuum apparatus is connected to the enclosure via a vacuum hose extending through an opening in the enclosure.

This shelter is still subject to various disadvantages, and does not necessarily exclude all debris generated within the shelter from entering the surrounding space. Use of a stepladder within the enclosure is awkward and inconvenient, particularly with varying ceiling heights. The external vacuum apparatus requires access through an opening in the enclosure, and this can cause leakage of contaminants if not properly sealed.

SUMMARY OF THE INVENTION

It is an object of the present invention to provide a new and improved mobile enclosure unit for protecting the surrounding environment from contaminants when performing construction or repair work on or within a ceiling within a building.

According to the present invention, a mobile enclosure unit is provided, which comprises a vertical, wheeled frame of generally rectangular cross-section having an open upper end and a closed lower end, the frame being adjustable in height so that the open upper end can be positioned in contact with a ceiling, a working platform adjustably mounted in the frame and movable to a selected height in the frame, the frame having a lower wall, a pliable cover sleeve surrounding the frame to form a chamber within the frame having an open upper end to allow a worker standing on the working platform to access a ceiling area above the open end of the frame, the sleeve extending from the lower wall to the upper end of the frame, and an exhaust system mounted in the frame inside the sleeve for drawing in air from the chamber, filtering debris from the air, and exhausting filtered air from the chamber to create a negative air pressure.

Preferably, the exhaust system includes an intake passageway having an intake opening adjacent the upper end of the frame and an outlet end, a filter unit connected to the outlet end of the intake passageway, and a suction unit such as a fan or vacuum pump connected to the filter unit for drawing air from the chamber through the intake passageway and filter unit, the suction unit having an outlet for exhaust of filtered air out of the enclosure. Preferably, the filter unit, suction unit, and exhaust outlet are provided on the lower wall of the frame. The filter unit is preferably a HEPA filter.

The open upper end of the frame is preferably adjustable in width to expose a smaller or greater ceiling area above the frame. The sleeve forms side walls of the enclosure and is preferably of a pliable fabric or plastic material, and is of sufficient height to extend from the upper end to the lower end of the frame when it is extended to its maximum height. The sleeve has an open upper end suitably secured to the open upper end of the frame, with the upper end being of width equal to the maximum width of the upper end of the frame when fully extended.

Both the frame and the sleeve are preferably of rectangular horizontal cross-section, having four perpendicular side walls. Preferably, the side walls of the sleeve are formed as separate panels which are releasably secured together by suitable fasteners such as zippers. An access opening into the chamber is provided by a cut out portion in one of the panels forming a door, with the cut out portion releasably securable to the remainder of the panel by a suitable releasable fastener such as a zipper.

A seal device is preferably provided around the open upper end of the frame and sleeve, to form a seal against a ceiling when the frame is extended to ceiling height. The seal may be of compressible rubber, foam material, or the like.

The enclosure unit of this invention can be readily positioned beneath a ceiling area where maintenance or the like is to be carried out. The frame is then extended until the seal device around the upper end is pressed against the ceiling around the area where work is to be carried out. The working platform is positioned at a suitable height, and, after entering the chamber within the outer sleeve, the worker closes and seals the entry opening. The exhaust system is then turned on. While work is carried out, any dust or debris created will be pulled downwards into the enclosure. Any airborne contaminants will be pulled in to the intake passageway and filtered out before exhausting the cleaned and filtered air back into the surrounding environment.

Preferably, a HEPA vacuum attachment is provided in the sleeve to allow the hose of a HEPA vacuum unit to extend into the chamber, where it can be used to vacuum off any debris that is attached to the frame, working platform, or to the worker's clothing. Thus, the worker can vacuum off any debris before leaving the unit, further reducing the risk of introducing contaminants into the surrounding environment.

The mobile enclosure unit of this invention provides a convenient chamber for providing workers with access to a ceiling area while containing debris produced by the work. The unit includes a filtering system for filtering out any airborne debris produced by the workers, as well as a vacuum attachment to allow other debris attached to the unit or to the worker's clothing to be cleaned up before opening and exiting the chamber. This significantly reduces or eliminates the risk of contaminating areas surrounding a site where ceiling construction or maintenance is being carried out.

BRIEF DESCRIPTION OF THE DRAWINGS

The present invention will be better understood from the following detailed description of a preferred embodiment of the invention, taken in conjunction with the accompanying drawings in which like reference numerals refer to like parts and in which.

DESCRIPTION OF THE PREFERRED EMBODIMENT

Figure 1:
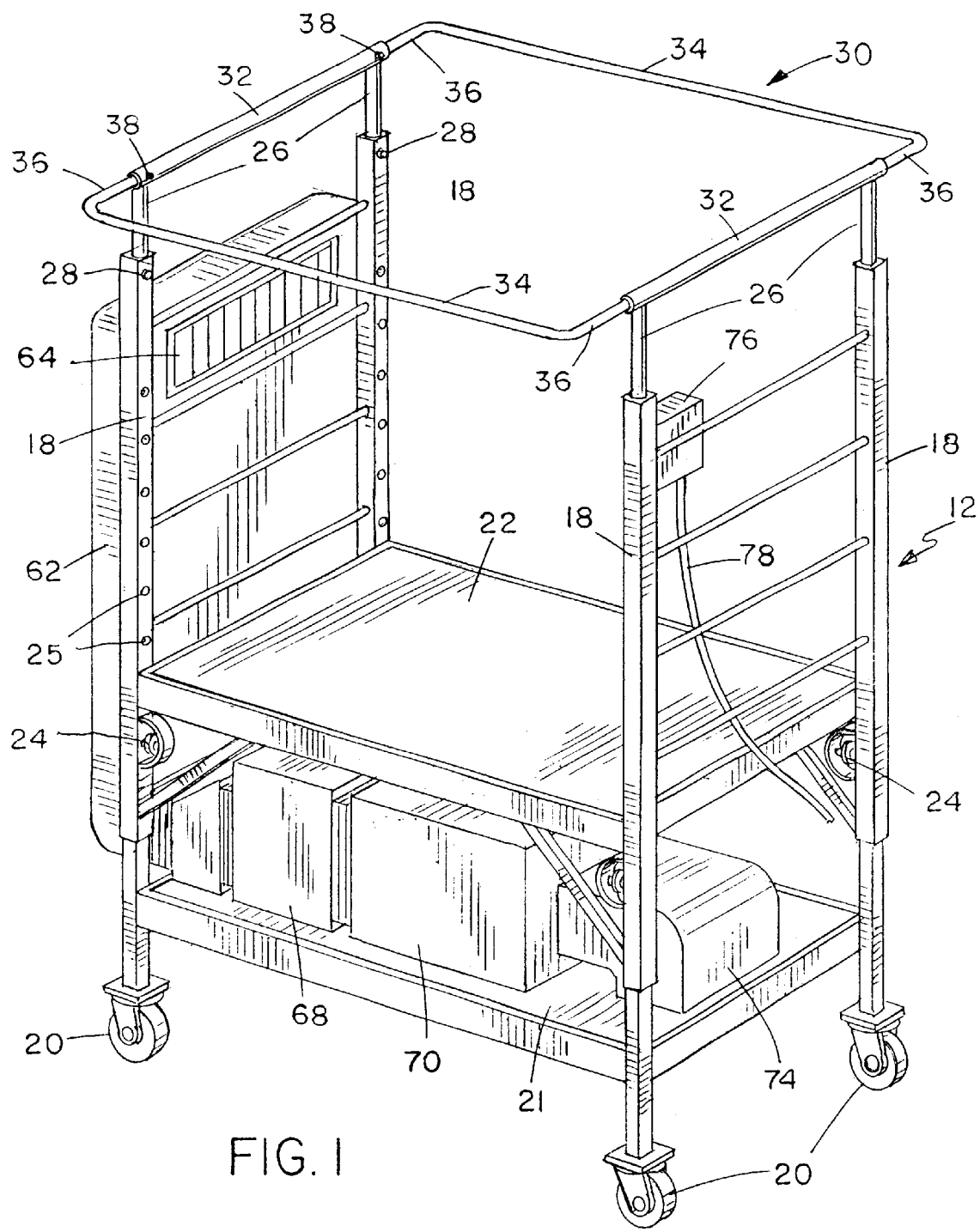
FIG. 1 is a perspective view of the frame assembly of a mobile enclosure unit according to a preferred embodiment of the invention.
Figure 2:
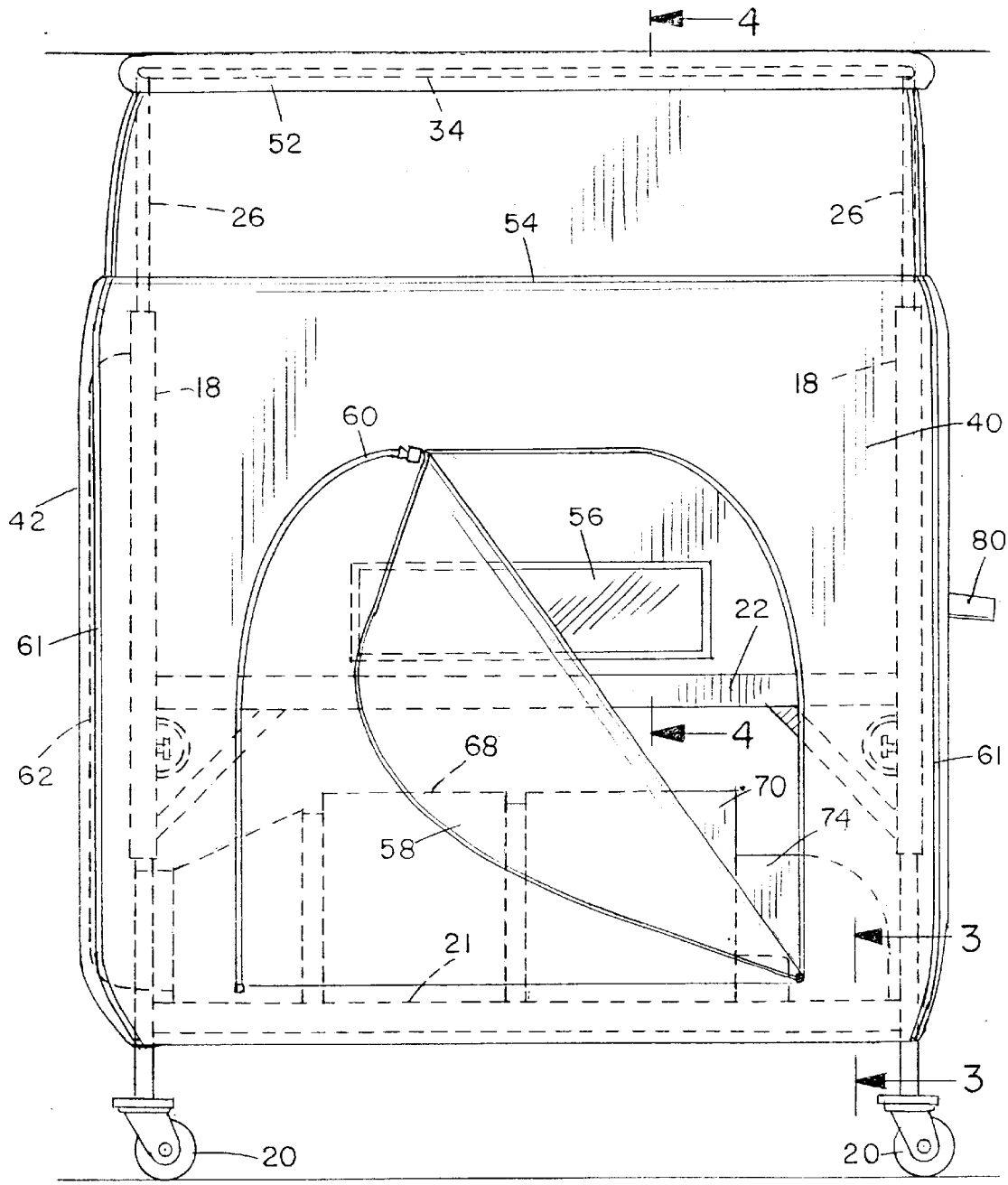
FIG. 2 is a side view of the complete unit with the cover attached and the entry panel partially open.
Figure 3:
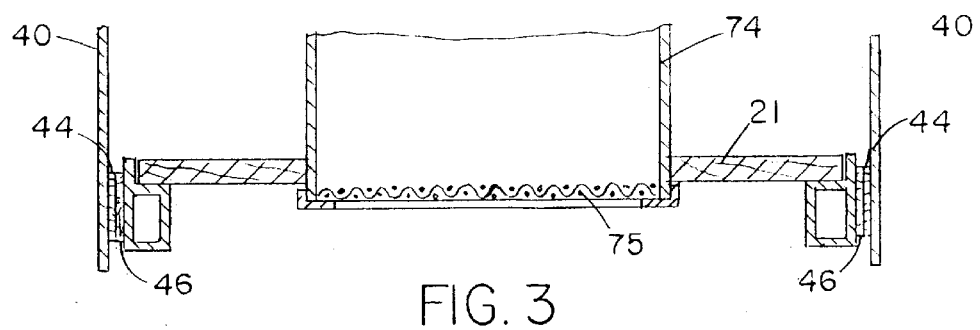
FIG. 3 is an enlarged sectional view taken on line 3—3 of FIG. 2.
Figure 4:
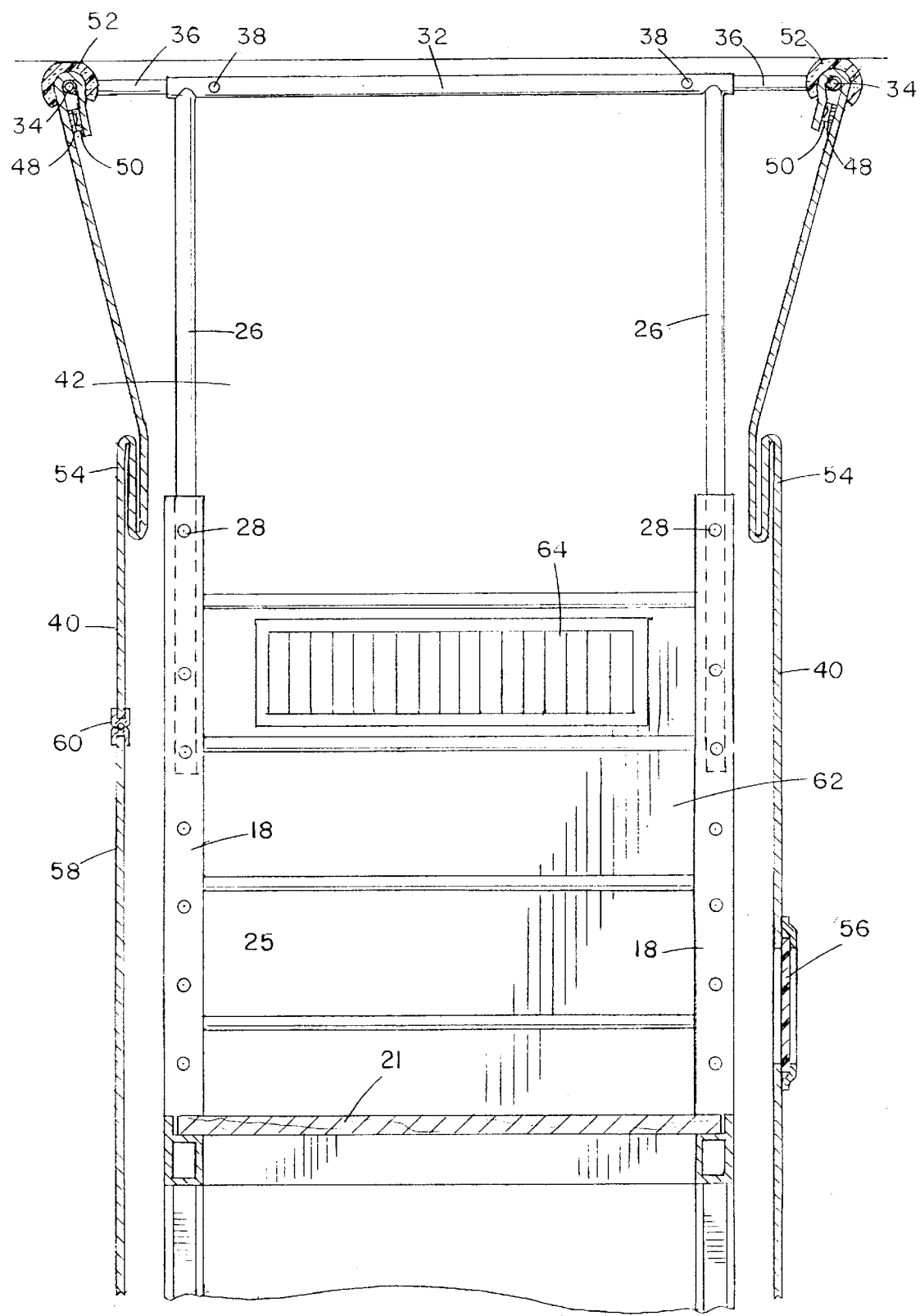
FIG. 4 is an enlarged sectional view taken on line 4—4 of FIG. 2.

FIGS. 1 to 5 illustrate a mobile enclosure unit or contaminant containment unit 10 according to a preferred embodiment of the present invention. FIG. 1 illustrates the inner frame assembly 12 of the unit, while FIGS. 2 to 4 illustrate the complete unit with the pliable cover sleeve 14 covering the frame to form an enclosed working chamber 16.

The frame assembly 12 comprises a generally rectangular, vertical frame having four corner uprights 18 each having a caster wheel 20 at its lower end, a lower fixed wall 21 extending between the uprights at the lower end of the frame above the wheels, and a working platform 22 adjustably mounted on the uprights for movement to any selected working height on the frame. The platform 22 is secured to the uprights at its four corners by means of four releasable locking pins 24 which extend through aligned holes 25 in the respective upright to secure the platform at the desired height. This locking mechanism is preferably the same as that used in scaffolds manufactured by Perry Manufacturing, Inc. of Indianapolis, Ind.

Each upright 18 of the assembly has an upper extension rod 26 telescopically engaged in the upper end of upright 18 and releasably securable at a selected extension via locking screw 28. A rectangular open frame 30 is secured to the upper ends of the uprights 18, defining an open upper end of the frame. The frame 30 is adjustable in width to vary the size of the opening at the upper end of the frame. Frame 30 includes tubular opposite end members 32, and opposite side members each comprising a side portion 34 and opposite end portions 36 extending perpendicular to the side portion and telescopically engaging in the ends of the respective end members 32. The side members can be extended outwardly from the position illustrated in FIG. 1 and secured at a selected extended position via releasable lock pins 38, in order to vary the size of the upper end opening of the frame.

As best illustrated in FIGS. 2 and 4, the frame assembly is enclosed in the outer cover or sleeve 14, which is of rectangular shape and of height corresponding to the maximum height of the frame assembly when fully extended. The cover 14 is formed from a pair of side panels 40 and a pair of end panels 42 suitably connected together at the corners of the cover, and a bottom panel 90 releasably secured to the lower ends of the side and end panels. The cover is formed of any suitable pliable material, such as plastic, sail cloth, coated fabric, or the like. The open lower end of the panels 40, 42 and outer periphery of bottom panel 90 are secured together and to the frame and lower end wall of the frame assembly in any suitable fashion. FIG. 3 illustrates one possible means of attachment of the lower end of the cover and periphery of panel 90 to the frame. As illustrated in FIG. 3, the outer edge of panel 90 is sandwiched between the lower edges of panels 40, 42 and the peripheral edge of wall 21. Strips 44 of hook or loop type fastener material such as Velcro® are secured along the inner edge of bottom panel 90, and corresponding strips 46 of mating loop or hook type fastener material are secured along the outer edges of the floor or lower wall 21 of the frame assembly. Second strips 92 of hook and loop fastener material are secured along the outer edge of panel 90, for making engagement with corresponding strips 94 on the inner side of each panel 40,42 adjacent its lower edge. This forms a substantially sealed lower end of the enclosure.

The upper end of the cover is secured to the open upper frame 30 of the frame assembly by folding the cover edges over the top of the frame and then downwardly, and securing the cover edges to opposing portions of the cover via mating strips 48,50 of hook and loop type fastener material, as illustrated in FIG. 4. A seal member 52 of resilient material such as rubber or foam is secured over the frame 30 and cover as illustrated in FIG. 4. The seal member may comprise a pipe insulation tube of about 4 inches in diameter, split longitudinally so it can be fitted over the frame 30 as in FIG. 4.

The upper portion of the cover is preferably of larger cross-sectional dimensions than the remainder of the cover, to accommodate expansion of the upper end opening of the frame by extending the side members of frame 30 outwardly. Thus, the width of the upper end of the cover is at least equal to the maximum width of frame 30 when the side members are fully extended. The cover will fold in on itself either vertically or horizontally when the frame assembly is at less than its maximum height or width, as generally illustrated at 54 in FIG. 4.

Preferably, a transparent window 56 is provided in at least one of the side panels 40. As best illustrated in FIG. 2, the other side panel has an entry or doorway formed by a cut-out, door portion 58 of the panel releasably secured to the remainder of the panel via a zipper fastener 60. The zipper is opened to allow workers to enter or exit the interior or working chamber defined by the area enclosed by the cover and frame assembly, and the door portion 58 is fastened shut while work is carried out.

The panels 40,42 are preferably releasably secured together at the corners of the cover by zipper fasteners 61, permitting a panel to be readily removed and replaced if damaged. This arrangement also allows two or more enclosure units to be secured together in a single outer cover if a larger ceiling area is to be covered, simply by removing opposing side or end panels of units to be secured together end-to-end or side-by-side, placing the units together with their open ends or sides facing one another, and zipping the two covers together.

Figure 5:
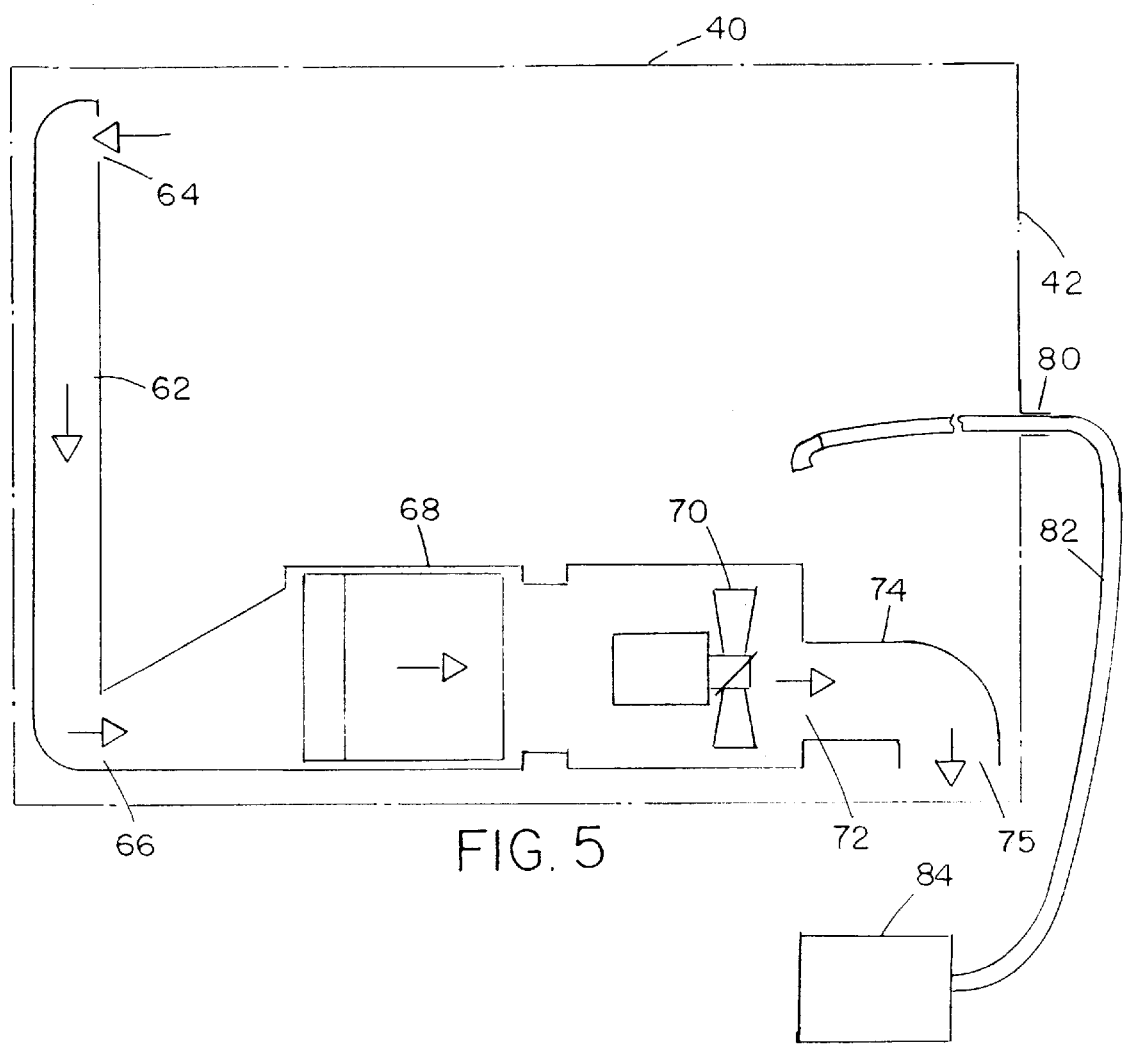
FIG. 5 is a diagram of the air filtering system.

A filter system is mounted on the frame assembly 12 within the outer cover for filtering contaminants from air inside chamber 16 and exhausting clean air from the unit. The filter system is schematically illustrated in FIG. 5, and basically comprises an intake passageway or conduit 62 having an inlet end 64 and an exit end 66, a filter unit 68 having an inlet connected to the exit end 66 of the intake passageway, and a suitable suction device such as a fan 70 having an intake connected to the outlet of filter unit 68. The outlet 72 of fan 70 is connected to an exhaust duct 74 with an exhaust vent 75 in the lower wall 21 of the frame assembly, as best illustrated in FIGS. 1, 3 and 5. Bottom panel 90 of the cover has a central opening 95 secured around the periphery of vent 75, as indicated in FIG. 3.

The intake passageway or duct 62 is mounted on one end of the frame assembly, as best illustrated in FIGS. 1 and 2, with the inlet vent or intake 64 directed inwardly adjacent the upper end of uprights 18. The filter unit 68 and fan 70 are supported on the lower wall 21. The filter unit 68 is preferably a 99.9% HEPA filter, while the suction device may be a 1,000 CFM exhaust fan or the like. The exhaust vent or duct 74 directs clean air downwardly from fan 70 through the lower wall of the housing to vent to the surrounding atmosphere.

An electrical socket unit 76 is preferably mounted on the frame assembly within the cover, and connected to a suitable wall outlet or other power source via a power cord 78 extending from the unit 76 and out through the lower end of cover 14. Unit 76 preferably has several plug outlets and an on/off switch, and enables various power tools to be connected to the power source within the unit, rather than requiring several cables to extend through the outer cover.

An inlet sleeve or tubular connector 80 for a vacuum hose 82 is preferably provided in one of the end panels 42. The hose 82 is connected to a HEPA vacuum unit 84 outside the unit, and extends into the chamber 16 through inlet sleeve 80, permitting workers inside the chamber to vacuum surfaces within the chamber.

The mobile enclosure unit 10 can readily be used to provide a contaminant containment chamber for workers when doing installation or maintenance work on or in a ceiling area within a building. This is particularly important in sensitive areas such as hospitals, clinics, laboratories or the like, where release of contaminants or debris can pose a hazard. The frame assembly is preferably designed to expand from a height of approximately 6 feet 3 inches (1.9 meters) to a maximum height of around 11.5 feet (3.5 meters). The upper frame 30 is preferably designed to expand from a width of approximately 30 inches (0.76 meters) to a width of approximately 50 inches (1.26 meters). Units may also be stacked vertically to accommodate greater ceiling heights. The caster wheels on one unit are removed, and the upper frame 30 of another unit is also removed. The first unit is then stacked on top of the second unit, with the lower ends of uprights 18 engaging over the upper extension rods 26 of the second unit. The lower end of the cover of the upper unit may also be secured to the upper end of the lower unit cover, via hook and loop fastener strips 44 and 50.

For all normal height ceilings, a single unit 12 will usually be sufficient to shield a ceiling area which is being worked on. The workers first position the unit under the ceiling area, then extend the upper extension rods 26 until the seal member 52 is pressed against the ceiling 86, as best illustrated in FIG. 2. The rods 26 are then secured in this position by tightening locking screws 28. Frame 30 will then surround the ceiling area where construction or maintenance is to be carried out. The working platform 22 is then adjusted to an appropriate height for the workers to access the working area on or in the ceiling, and the lock pins 38 are tightened to secure the platform in position. The workers then enter the working chamber through the doorway and refasten zipper 60 to close the door flap 58.

The vacuum or filtering system is then turned on, and operates continuously until the job is completed, with air flowing through the system as illustrated in FIG. 5. Thus, airborne debris is continuously filtered out of the air within the chamber, and clean air is exhausted into the area around the unit. On completion of the job, the workers can readily vacuum the working area as well as their clothes with vacuum hose 82, removing any debris which has fallen onto the interior surfaces of the unit or the workers themselves. Thus, the risk of contaminating the surrounding environment with airborne or non-airborne debris, dust, dirt, construction materials or the like is considerably reduced or eliminated.

Although a preferred embodiment of the invention has been described above by way of example only, it will be understood by those skilled in the field that modifications may be made to the disclosed embodiment without departing from the scope of the invention, which is defined by the appended claims.

We claim:

1. A mobile enclosure unit, comprising:
    a vertical, wheeled frame assembly having an open upper end and a lower wall, the frame assembly being adjustable in height so that the open upper end can be positioned in contact with a ceiling to surround an area of the ceiling to be worked on;
    a pliable cover sleeve surrounding the frame assembly to form a chamber within the frame assembly having an open upper end to allow a worker in the chamber to access the ceiling area above the open end of the frame assembly, the sleeve extending from the lower wall to the upper end of the frame;
    an exhaust system mounted in the frame inside the sleeve for drawing in air from the chamber, filtering debris from the air, and exhausting filtered air from the chamber, whereby a negative air pressure is created within the chamber; and
    a rectangular, horizontal frame secured to the upper end of the frame assembly for defining the open upper end of the assembly, the frame being adjustable between a predetermined minimum width and a predetermined maximum width for controlling the size of the upper end opening of the frame assembly.

2. The unit as claimed in claim 1, including a working platform adjustably mounted in the frame assembly and movable to a selected height in the frame assembly.

3. The unit as claimed in claim 1, wherein the exhaust system includes an intake passageway having an intake opening adjacent the upper end of the frame and an outlet end, a filter unit connected to the outlet end of the intake passageway, and a suction unit connected to the filter unit for drawing air from the chamber through the intake passageway and filter unit, the suction unit having an outlet for exhaust of filtered air out of the enclosure.

4. The unit as claimed in claim 3, wherein the filter unit, suction unit, and exhaust outlet are supported on the lower wall of the frame.

5. The unit as claimed in claim 1, wherein the frame assembly is of generally rectangular cross-section with four corners, and has an upright at each corner, each upright being adjustable in length to adjust the height of the frame assembly from a predetermined minimum height to a predetermined maximum height, and the cover has a height equal to the maximum height of the frame assembly.

6. The unit as claimed in claim 5, wherein each upright comprises a first, lower member having a lower end and an upper end, a second, upper extension member telescopically engaged with the upper end of the lower member, and a releasable locking device for releasably securing the two members together at a selected extension.

7. The unit as claimed in claim 1, including an electrical socket unit secured to the frame assembly inside the unit, the socket unit having a cable for connecting the unit to a power source outside the unit.

8. The unit as claimed in claim 1, wherein the upper end of the sleeve has a predetermined width at least equal to the predetermined maximum width of the rectangular frame.

9. The unit as claimed in claim 1, wherein the frame and sleeve are of rectangular horizontal cross-section, the sleeve having opposite side panels and end panels.

10. The unit as claimed in claim 9, including releasable securing means for releasably securing the side panels and end panels together at the corners of the sleeve.

11. The unit as claimed in claim 10, wherein the releasable securing means comprise zipper fasteners.

12. The unit as claimed in claim 9, wherein one of the panels has a partially cut out portion forming a door providing an access opening into the chamber, and a releasable securing device for releasably securing the door to the remainder of the panel to close the opening.

13. The unit as claimed in claim 9, wherein at least one of the panels has a window.

14. The unit as claimed in claim 9, wherein at least one of the panels has an access port for entry of a vacuum hose of a vacuum cleaner unit into the chamber.

15. The unit as claimed in claim 14, including a vacuum cleaner unit outside the sleeve, the vacuum unit having a hose extending through the sleeve into the chamber for use in cleaning regions inside the chamber.

16. The unit as claimed in claim 1, including a seal member extending around the open upper end of the frame and sleeve for forming a seal against a ceiling when the frame is extended to ceiling height.

17. A mobile enclosure unit, comprising:

a vertical, wheeled frame assembly having an open upper end and a lower wall, the frame assembly being adjustable in height so that the open upper end can be positioned in contact with a ceiling to surround an area of the ceiling to be worked on;

a pliable cover sleeve surrounding the frame assembly to form a chamber within the frame assembly having an open upper end to allow a worker in the chamber to access the ceiling area above the open end of the frame assembly, the sleeve extending from the lower wall to the upper end of the frame assembly and having an open lower end;

an exhaust system mounted in the frame inside the sleeve for drawing in air from the chamber, filtering debris from the air, and exhausting filtered air from the chamber, whereby a negative air pressure is created within the chamber;

a working platform adjustably mounted in the frame assembly and movable to a selected height in the frame assembly;

a bottom panel secured across the open lower end of the sleeve below the lower wall of the frame assembly;

the bottom panel and lower wall of the frame assembly each having an outer periphery;

a first fastener device extending around the outer periphery of the lower wall of the frame assembly; and a second fastener device extending around the outer periphery of the panel for releasable attachment to said first fastener device to secure the lower end of the sleeve and outer periphery of the bottom panel to the frame assembly.

18. The unit as claimed in claim 17, wherein the fastener devices comprise mating strips of hook and loop fastener material.

19. The unit as claimed in claim 17, wherein the frame assembly has an open frame defining the open upper end of the assembly, and the upper end of the sleeve is releasably secured over the open frame.

* * * * *